United States Patent [19]

Sato et al.

[11] Patent Number: 5,132,950
[45] Date of Patent: Jul. 21, 1992

[54] OPTICAL HEAD HAVING A PRISM FOR SPLITTING A BEAM OF LIGHT INTO TWO POLARIZED LIGHT BEAMS

[75] Inventors: Katsuharu Sato; Naoharu Yanagawa, both of Saitama, Japan

[73] Assignee: Pioneer Electronic Corporation, Tokyo, Japan

[21] Appl. No.: 466,558

[22] Filed: Jan. 17, 1990

[30] Foreign Application Priority Data

May 2, 1989 [JP] Japan .................................. 1-112022
May 2, 1989 [JP] Japan .................................. 1-112024
May 2, 1989 [JP] Japan .................................. 1-112025

[51] Int. Cl.$^5$ ................................................ G11B 7/00
[52] U.S. Cl. .............................. 369/44.14; 369/44.41; 369/112
[58] Field of Search ............... 250/201.5, 44.14, 44.11, 250/44.37, 44.41, 112, 32

[56] References Cited

U.S. PATENT DOCUMENTS 4,505,584  3/1985  Kato et al. ...................... 369/44.14 X
4,771,414  9/1988  Yoshimatsu ........................ 369/110
4,873,678  10/1989  Nakamura et al. .................... 369/13

Primary Examiner—Robert L. Richardson
Attorney, Agent, or Firm—Sughrue, Mion, Zinn, Macpeak & Seas

[57] ABSTRACT

An optical head for use with a photomagnetic recording/reproducing device which is small in number of parts, compact in light path, small in overall size, easy to assemble and adjust, small in number of errors in adjustment, and high in reliability. The optical head comprises a prism for splitting a beam of light from an objective lens, and a light receiving element for receiving light from the prism to produce an electric signal from which a servo signal and a reproduction signal are to be produced. The prism has parallel incident and emergent side transmitting faces and first and second parallel reflecting faces. The prism may include first and second optical members of uniaxial crystal adhered to each other with optical axes thereof directed perpendicularly to each other or first and second optical members which define a polarizing splitting face on an interface therebetween. The light receiving element has two light receiving areas which are each divided into two or more circular or rectangular sections and individually receive split beams of light from the prism.

9 Claims, 7 Drawing Sheets

OPTICAL HEAD HAVING A PRISM FOR SPLITTING A BEAM OF LIGHT INTO TWO POLARIZED LIGHT BEAMS

BACKGROUND OF THE INVENTION

1. Field of the Invention

This invention relates to an optical head wherein reflected light of a laser beam from a record medium is condensed into a beam of light and then split into two beams of light which are received by a light receiving element to produce a servo signal and/or a photomagnetic reproduction signal, and more particularly to an optical head suitable for use with a photomagnetic recording/reproducing device.

2. Description of the Prior Art

Figure 17:
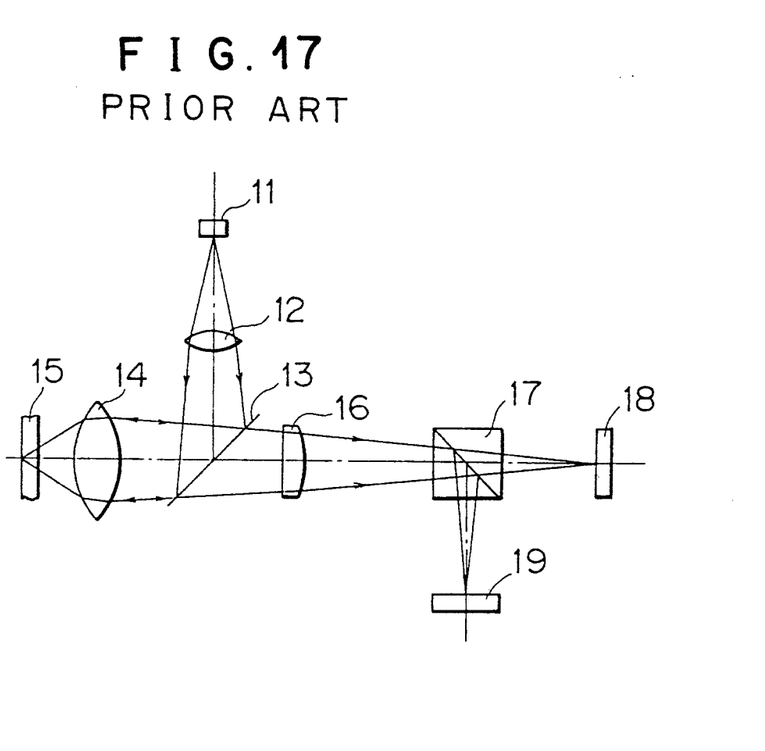
FIG. 17 is a diagrammatic representation showing an optical system of a conventional optical head.

An exemplary one of conventional optical heads of the type mentioned is first described with reference to FIG. 17. The optical head shown includes a semiconductor laser 11 serving as a source of a laser beam, a collimator lens 12 for collimating light from the semiconductor laser 11 into substantially parallel light, a separating element 13 such as a separating prism for reflecting light from the light source 11 but transmitting reflected light from a photomagnetic disk 15 which serves as a record medium, an objective lens 14 for focusing light reflected from the separating element 13 upon a face of the photomagnetic disk 15, a cylindrical lens 16 having a focusing function only in one direction, a polarizing beam splitter 17 for splitting a beam of light from the cylindrical lens 16 into P polarized light and S polarized light, and first and second light receiving elements 18 and 19 for receiving beams of P polarized light and S polarized light, respectively, from the polarizing beam splitter 17 and individually converting the received light signals into electric signals.

In the optical head, a beam of laser light emitted from the semiconductor laser 11 is substantially collimated by the collimator lens 12, then reflected by the separating element 13, and then focused to a diffraction limit upon the photomagnetic disk 15 by the objective lens 14.

Then, light reflected from the photomagnetic disk 15 is converted into a converging beam of light (a beam of light which converges to a point as it advances) by the objective lens 14 and then passes through the separating element 13, whereafter it passes through the cylindrical lens 16 toward the polarizing beam splitter 17 whereupon astigmatism is provided to the beam of light. Then, P polarized light which has passed through the polarizing beam splitter 17 forms a spot of light on a light receiving face of the first light receiving element 18 while S polarized light reflected by the polarizing beam splitter 17 forms a spot of light on a light receiving face of the second light receiving element 19.

In a photomagnetic recording/reproducing system which employs such an optical head as described above, information signals are recorded depending upon directions of magnetization of a perpendicular magnetic film of a photomagnetic disk, and the direction of rotation of linearly polarized light of a beam of laser light reflected by the disk is detected to reproduce the record signals. In particular, a record signal will appear as a difference in amount of light between beams of P polarized light and S polarized light split by the polarizing beam splitter 17, and consequently, a photomagnetic reproduction signal is differentially detected depending upon a difference between outputs of the first and second light receiving elements 18 and 19 individually produced in accordance with amounts of light received.

Meanwhile, a focus error signal and a tracking error signal (Servo signals) are produced from outputs of the light receiving elements 18 and 19. In the arrangement described above, a focus error signal is produced in accordance with an astigmatism method.

Figure 18:
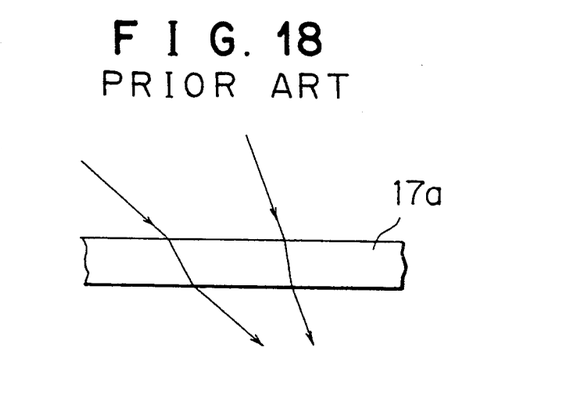
FIG. 18 is a diagrammatic representation illustrating a disadvantage of a polarizing splitting film of a conventional optical head.

With such a conventional optical head as described above, however, a cylindrical lens or the like for providing astigmatisms to light is required. Futhermore, two light receiving elements must be used because P polarized light and S polarized light are split at a right angle (by splitter 17). Consequently, the conventional optical head requires a comparatively great number of components and a high degree of accuracy in positional relationship between a light path and such components. Accordingly, the optical head is disadvantageous in adjusting operation and reliability. Further, the overall size of the optical head itself is comparatively great because light paths of beams of P polarized light and S polarized light make the right angle. Since the polarizing beam splitter 17 has an angle dependency in polarizing splitting action thereof (a difference between incidence angles of two beams of light makes a difference between optical paths of the beams of light as seen from FIG. 18), splitting of a beam of light into two beams of P polarized light and S polarized light is not performed in equal conditions. Accordingly, there is a problem that, even if a photomagnetic reproduction signal is detected differentially, some deterioration in the common-mode rejection ratio cannot be eliminated.

In addition, the two light receiving elements 18 and 19 of the conventional optical head described above must necessarily be adjusted in three axial directions because split beams of P polarized light and S polarized light are focused at different points spaced from each other and thus received by the two light receiving elements 18 and 19, respectively, at such locations. Accordingly, the conventional optical head is disadvantageous in adjusting operation and reliability.

SUMMARY OF THE INVENTION

It is an object of the present invention to provide an optical head for use with a photomagnetic recording/reproducing device which is small in number of parts, compact in light path, small in overall size, easy to assemble and adjust, small in number of errors in adjustment, and high in reliability.

It is another object of the present invention to provide an optical head which can prevent possible deterioration of the common-mode rejection ratio when a photomagnetic reproduction signal is produced.

It is a further object of the present invention to provide an optical head wherein various components have comparatively high degrees of freedom in adjustment of position and hence an adjusting operation of the head is facilitated and the reliability of the optical head is improved.

In order to attain the above objects, according to one aspect of the present invention, there is provided an optical head which comprises a light source for emitting a laser beam, an objective lens for projecting a laser beam from the light source to a record medium and for condensing light reflected from the record medium, a prism for splitting a beam of light from the objective lens into two beams of P polarized light and S polarized light, and a light receiving element for receiving light from the prism to produce an electric signal from which a servo signal and a reproduction signal are to be produced, the prism being composed of a first optical member of uniaxial crystal and second optical member also of uniaxial crystal, the first optical member having an incident side transmitting face and a first reflecting face which make an angle substantially equal to 45 degrees therebetween, the second optical member having an emergent side transmitting face and a second reflecting face which make an angle substantially equal to 45 degrees therebetween, the first and second optical members being adhered to each other such that optical axes thereof are directed perpendicularly to each other and the incident side transmitting face and the emergent side transmitting face extend in a parallel opposing relationship to each other while the first and second reflecting faces extend in a parallel opposing relationship to each other, the prism being disposed such that the incident side transmitting face thereof is inclined by an angle of about 45 degrees with respect to an optical axis of a beam of light from the objective lens and a beam of light from the objective lens is introduced into the prism by way of the incident side transmitting face so that the beam of light is split into two beams of P polarized light and S polarized light due to double refraction and is successively reflected by the first and second reflecting faces whereafter the two split beams of light emerge substantially in parallel to the incident beam of light to the prism from the emerging side transmitting face of the prism.

With the optical head, since the prism wherein the first and second optical members of uniaxial crystal are adhered to each other with the optical axes thereof directed perpendicularly to each other is disposed such that a beam of light from the objective lens may be internally reflected successively by the parallel reflecting faces and split into two beams of P polarized light and S polarized light due to double refraction of the prism and then the two split beams may emerge from the prism in parallel to the incident beam of light to the prism, the number of components such as a light receiving element can be reduced and light paths can be made compact. Accordingly, the optical head itself can be reduced in overall size, facilitated in assembly and adjustment, reduced in errors in adjusment, and improved in reliability. Moreover a possible deterioration of the common-mode rejection ratio when a photomagnetic reproduction signal is produced can be prevented.

According to another aspect of the present invention, there is provided an optical head which comprises a light source for emitting a laser beam, an objective lens for projecting a laser beam from the light source to a record medium and for condensing light reflected from the record medium, a light beam splitting means for splitting a beam of light from the objective lens into two adjacent beams of light, and a light receiving element for receiving light from the light beam splitting means to produce an electric signal from which a servo signal is to be produced, the light receiving element having two light receiving areas each of which is divided into two or more parallel sections with a dividing line or lines, the dividing lines for the light receiving areas extending perpendicularly to each other, the light receiving element being disposed such that two light beams split by the light beam splitting means may be individually received by the two light receiving areas of the light receiving element.

With the optical head, two adjacent beams of light split from a converging beam of light are individually received by the two light receiving areas of the light receiving element which are each divided into two or more parallel sections with a dividing line or lines which extend perpendicularly to a dividing line or lines for the other light receiving area. Thus the degree of freedom of adjusted positions of the optical components is increased, which can facilitate an adjusting operation and improve the reliability of the optical head.

According to a further aspect of the present invention, there is provided an optical head which comprises a light source for emitting a laser beam, an objective lens for projecting a laser beam from the light source to a photomagnetic record medium and for condensing light reflected from the photomagnetic record medium, a prism for splitting a beam of light from the objective lens into two beams of P polarized light and S polarized light, and a light receiving element for receiving light from the prism to produce an electric signal from which a servo signal and a photomagnetic reproduction signal are to be produced, the prism having an incident side transmitting face inclined with respect to an optical axis of a converging beam of light from the objective lens, an emergent side transmitting face extending substantially in parallel to the ancident side transmitting face, a first reflecting face for reflecting a beam of light introduced thereto by way of the incident side transmitting face, a second reflecting face extending substantially in parallel to the first reflecting face for reflecting a reflected beam of light from the first reflecting face toward the emergent side transmitting face, and a polarizing splitting face located substantially in parallel to the first and second reflecting faces between the first and second reflecting faces, wherein a converging beam of light from the objective lens is introduced into the prism by way of the incident side transmitting face and then successively reflected by the first and second reflecting faces while the converging beam of light is split into two beams of P polarized light and S polarized light by the polarizing splitting face whereafter the two split beams of light emerge substantially in parallel to the incident converging beam of light to the prism from the emerging side transmitting face of the prism toward the light receiving element.

With the optical head, since a converging beam of light condensed by the objective lens in internally reflected successively by the parallel reflecting faces of the prism which has the polarizing splitting face formed therein so that it is split by the polarizing splitting film of the prism into two beams of P polarized light and S polarized light which then emerge from the prism in parallel to the incident beam of light to the prism, the number of components such as a light receiving element can be reduced and the light paths can be made compact. Accordingly, the optical head itself can be reduced in overall size and also in errors of adjustment to improve the reliability thereof.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENTS

Figure 1:
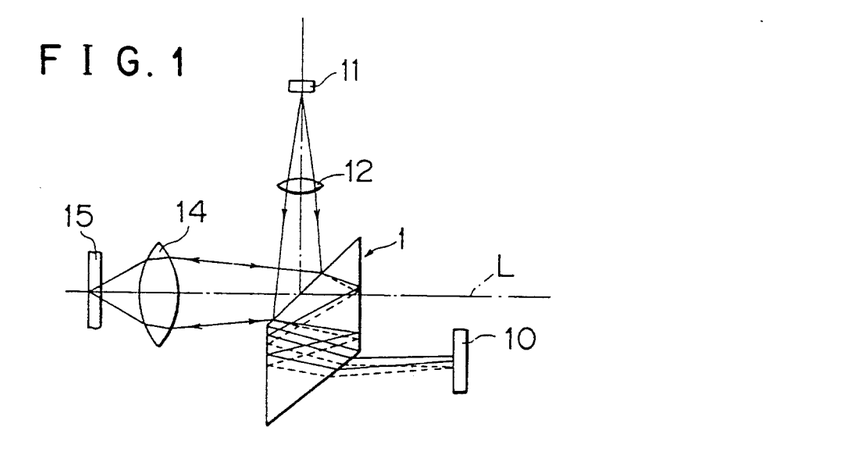
FIG. 1 is a diagrammatic representation of an optical system of an optical head showing a preferred embodiment of the present invention.

Referring first to FIG. 1, there is shown in diagrammatic representation an optical head to which the present invention is applied. The optical head shown includes a semiconductor laser 11 serving as a light source, a collimator lens 12 for collimating a laser beam from the semiconductor laser 11 into a substantially parallel beam of light, a prism 1, an objective lens 14 for focusing light from the prism 1 upon a face of the photomagnetic disk 15, and a light receiving element 10 for receiving light from the prism 1 and converting the received light into an electric signal from which a photomagnetic reproduction signal and a servo signal are to be extracted. The prism 1 is formed from a pair of blocks of uniaxial crystal adhered to each other and reflects a laser beam transmitted thereto from the semiconductor laser 11 by way of the collimator lens 12 toward the photomagnetic disk 15 by way of the objective lens 14. On the other hand, the prism 1 splits a beam of light from the objective lens 14 into P polarized light and S polarized light and introduces the thus split beams of polarized light to the light receiving element 10 whereupon the prism provides astigmatism to the beams of light.

Figure 2:
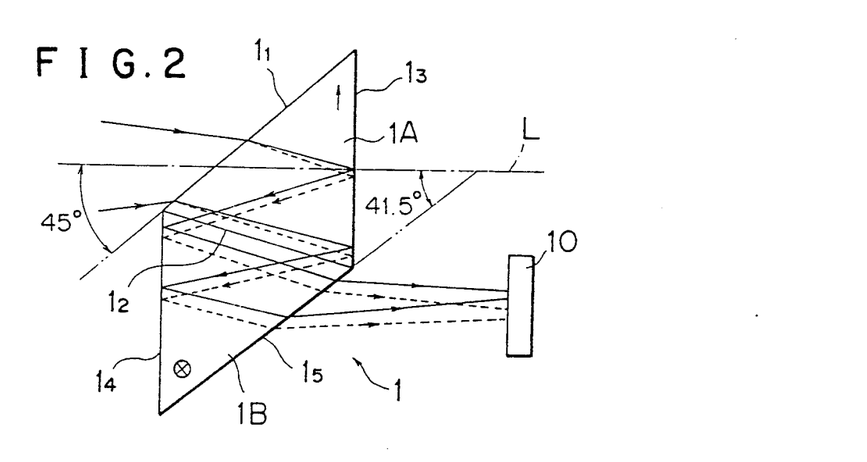
FIG. 2 is an enlarged diagrammatic representation showing a prism of the optical system of FIG. 1.

Referring also to FIG. 2, the prism 1 is particularly formed from a pair of block 1A and 1B each in the form of a triangular prism made of quartz crystal. The blocks 1A and 1B are adhered to each other along an interface $1_2$ by suitable means so that the prism 1 may have a substantially parallelogram shape in side elevation, and the prism 1 has four acting faces, namely an incident side transmitting face $1_1$ which reflects light on one hand and transmits light on the other hand, a pair of reflecting faces $1_3$ and $1_4$, and an emergent side transmitting face $1_5$.

The block 1A has an optical axis which is directed in a vertical direction parallel to the plane of FIG. 2 as indicated by an arrow mark " ↑ " in FIG. 2 while the other block 1B has an optical axis which is directed perpendicularly to the plane of FIG. 2 as indicated by a mark "x" in FIG. 2. Further, both of the blocks 1A and 1B have a refraction index of $n_0 = 1.5377$ with respect to ordinary light and a reflection index of $n_0 = 1.5466$ with respect to extraordinary light.

Meanwhile, the angles of the acting faces of the prism 1 are set such that the incident side transmitting face $1_1$ makes an angle of 45 degrees; the reflecting faces $1_3$ and $1_4$ make and angle of 90 degrees; and the emergent side transmitting face $1_5$ makes an angle of 41.5 degrees, with respect to an optical axis L of a beam of light (converging beam of light) from the objective lens 14. Further, the prism 1 is disposed in an inclined relationship such that a plane (incidence plane) which includes both of the optical axis L and a normal line to the incident side transmitting face $1_1$ may be inclined by an angle of 45 degrees with respect to the direction of a track of the photomagnetic disk 15.

The incident side transmitting face $1_1$ of the prism 1 serves as a polarizing splitting face wherein the ratio of a transmission factor $T_p$ to a reflectance $R_p$ for P polarized light, that is, $T_p/R_p$, is ½ while the ratio of a reflectance $R_s$ to a transmission factor $T_s$ for S polarized light, that is, $R_s/T_s$, is 1/100. The incident side transmitting face $1_1$ thus reflects a laser beam from the collimator lens 12 toward the objective lens 14 while part of a beam of light reflected by the photomagnetic disk 15 and condensed by the objective lens 14 passes through but is refracted by the incident side transmission face $1_1$ and introduced into the block 1A. It is to be noted that the incident side transmitting face $1_1$ may be replaced by a half mirror which detects part of a laser beam from the collimator lens 12 to pass through the incident side transmitting face $1_1$ in order to use the light for automatic power control of the light source 11.

A beam of light having passed through the incident side transmitting face $1_1$ is split into an ordinary beam of light (indicated by a solid line) and an extraordinary beam of light (indicated by a broken line) by double refraction of the incident side transmitting face $1_1$. The ordinary beam of light is refracted in such a manner as indicated by a solid line in FIG. 2 in accordance with the law of refraction and then reflected by the reflecting face $1_3$ of the prism 1 whereafter it enters the block 1B by way of the interface $1_2$ between the blocks 1A and 1B. Meanwhile, the extraordinary beam of light in the block 1A advances along a different light path with a different refraction index from the ordinary beam of light and is then reflected by the reflecting face $1_3$ whereafter it enters the block 1B by way of the interface $1_2$ as indicated by broken lines in FIG. 2.

The ordinary beam of light in the block 1A has a direction of oscillations of polarization perpendicular to the plane of FIG. 2 and thus makes an extraordinary beam of light in the block 1B. On the other hand, the extraordinary beam of light in the block 1A has a direction of oscillations of polarization parallel to the plane of FIG. 2. Consequently, the split condition of the two beams of light is further promoted, and the two beams of light advance along different light paths with different refraction indices and are then reflected by the reflecting face $1_4$ whereafter they pass through and are refracted by the emergent side transmitting face $1_5$ of the prism 1 and introduced to the light receiving element 10.

Two beams of light split in directions perpendicular to the optical axis L and advancing substantially in parallel to the optical axis L are introduced to the light receiving element 10 in this manner. The split beams of light here are linearly polarized beams of light (P polarized light and S polarized light) having oscillation planes of polarization perpendicular to each other. Meanwhile, a beam of light from the objective lens 14 is a converging beam of light and passes through the incident side transmitting face $1_1$ and the emergent side transmitting face $1_5$ both inclined relative to the optical axis L. Consequently, each of split beams of light is provided with astigmatism.

Since the beams of P polarized light and S polarized light to be introduced to the light receiving element 10 are split in a condition wherein optical axes thereof extend in parallel to each other at locations proximate to each other, they can be received by the single light receiving element 10. Since the beams of polarized light advance in directions substantially in parallel to the beam of light from the objective lens 14, the optical system can be made compact. In addition, astigmatism can be provided to each of the beams of polarized light without employing a cylindrical lens or the like.

Figure 3:
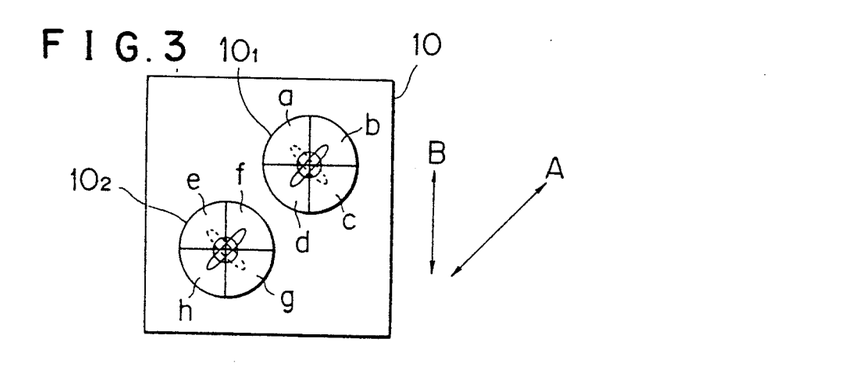
FIG. 3 is a diagrammatic illustration showing a light receiving face of a light receiving element of the optical system of FIG. 1.

FIg. 3 illustrates a light receiving face of the light receiving element 10. Referring to FIg. 3, the light receiving face has a pair of circular light receiving areas $10_1$ and $10_2$ formed thereon. Each of the light receiving areas $10_1$ and $10_2$ is divided into four areas a, b, c and d or e, f, g and f by a dividing line parallel to the direction of a track and another dividing line crossing perpendicularly to the dividing line. The light receiving element 10 is disposed such that the direction of an arrow mark A in FIG. 3 may coincide with the vertical direction parallel to the plane of FIG. 1 or 2. Thus, since the incidence plane of the incident side transmitting face $1_1$ of the prism 1 is inclined by 45 degrees with respect to the direction of a track as described hereinabove, the direction of a track on the light receiving face of the light receiving element 10 coincides with the direction indicated by another arrow mark B in FIG. 3.

Figure 4A:
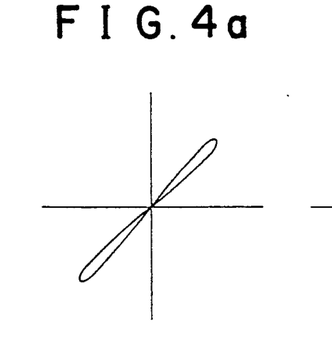
FIGS. 4a, 4b, 4c, 4d, 4e and 4f are diagrammatic illustrations showing different shapes of sports of light formed on the light receiving face shown in FIG. 3.
Figure 4B:
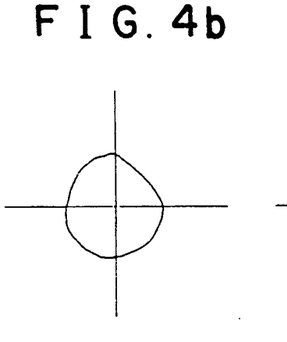
Figure 4C:
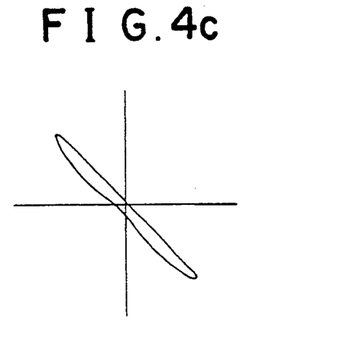
Figure 4D:
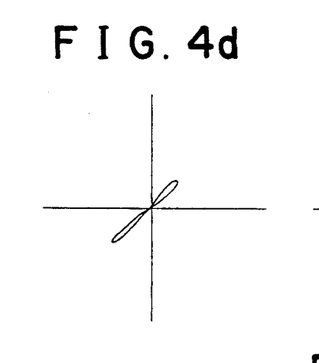
Figure 4E:
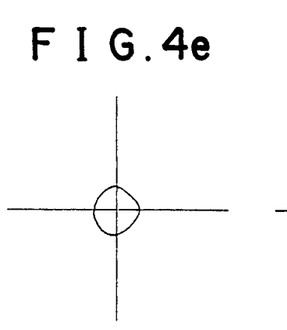
Figure 4F:
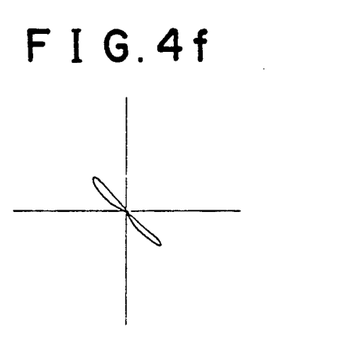

FIGS. 4a to 4f show different shapes of spots of light which may be formed on the light receiving areas $10_1$ and $10_2$ of the light receiving face from various beams of light. If the distance between the objective lens 14 and the photomagnetic disk 15 varies, then the spot shape in the light receiving area $10_1$ will vary in such a manner as shown in FIGS. 4a, 4b and 4c and the spot shape in the light receiving area $10_2$ will vary in such a manner as shown in FIGS. 4d, 4e and 4f.

In the case of the present embodiment, since the light paths of split beams of light are different in length, when such a spot as shown in FIG. 4b is formed in the light receiving area $10_1$, such a spot as shown in FIG. 4f is formed in the light receiving area $10_2$. Therefore, the optical system is set such that, when a spot of a laser beam on the photomagnetic disk 15 presents a minimum diameter, that is, when the objective lens 14 is in a best focused position, spots of light in the light receiving areas $10_1$ and $10_2$ may present similar shapes to those shown in FIGS. 4b and 4c, respectively.

It is to be noted that, in the present embodiment, the distortion (comatic aberration) of a spot in the best focused position of the objective lens 14 is minimized by setting the incident side transmitting face $1_1$ and the emergent side transmitting face $1_5$ of the prism 1 to 45 degrees and 41.5 degrees, respectively, with respect to the optical axis L.

Now, if outputs of the areas a to h corresponding to received light are represented by the reference characters of the areas and an addition and a subtraction of an output signal are represented by "+" and "−", respectively, then a focus servo signal F, a tracking servo signal T and a photomagnetic reproduction signal R are produced in accordance with the following equations, respectively:

$$F=[(a+c)-(b+d)]+[(e+g)-(f+h)]$$

$$T=[(a+d)-(b+c)]+[(e+h)-(f+g)]$$

$$R=(a+b+c+d)-(e+f+g+h)$$

The photomagnetic reproduction signal R obtained in this manner has a high C/N value while a focus servo signal is improved in that irregularities in intensity distribution of P polarized light and S polarized light caused by double refraction of a disk base plate are cancelled with each other and track crossing noises are reduced. Besides, since such focus servo signal and tracking servo signal are both produced from both of P polarized light and S polarized light, they have a doubled magnitude compared with those signals which are produced from only one of such components in accordance with a conventional method, and consequently, a stabilized servo can be attained.

It is to be noted that, where a reproduction signal is produced depending upon an amount of reflected light of a laser beam, the reproduction signal R' can be produced in accordance with an equation:

$$R'=(a+b+c+d)+(e+f+g+h)$$

Further, in case the optical system is set such that a spot of light in the light receiving area $10_1$ of the light receiving face of the light receiving element 10 has such a shape as shown in FIG. 4b in the best focused position of the objective lens 14, a focusing servo signal F' and a tracking servo signal T' can be produced in accordance with the following equations, respectively:

$$F'=(a+c)-(b+d)$$

$$T'=(a+d)-(b+c)$$

Figure 5A:
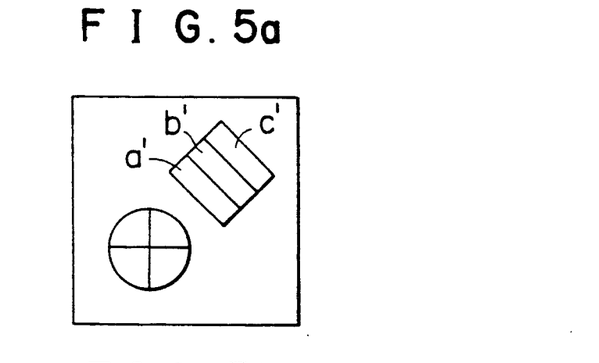
FIGS. 5a and 5b are diagrammatic illustrations showing different light receiving areas for a light receiving face from those of the light receiving face shown in FIG. 3.
Figure 5B:
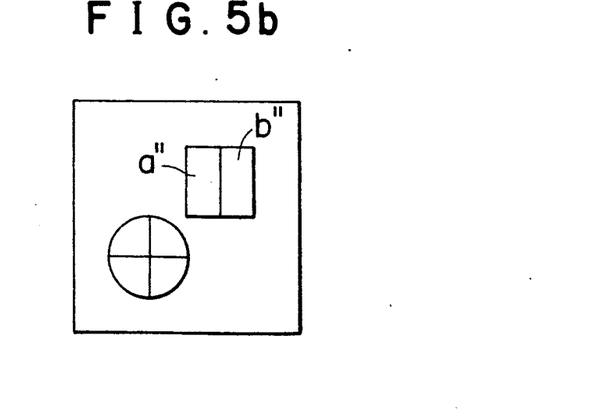

Further, while in the embodiment described above each of the light receiving areas $10_1$ and $10_2$ of the light receiving element 10 has a circular shape and is divided into four sections, one of the light receiving areas $10_1$ and $10_2$ may otherwise have such a square or rectangular shape which is divided into three parallel rectangular areas a', b' and c' as shown in FIG. 5a. Dividing lines for the rectangular areas a', b' and c' may extend at an angle of 45 degrees with respect to dividing lines of the other circular light receiving area so that a focus error signal may be produced from signals from the rectangular areas a', b' and c'. Or else, one of the light receiving areas $10_1$ and $10_2$ may have such a square or rectangular shape which is divided into two rectangular areas a'' and b'' as shown in FIG. 5b. A single dividing line for the rectangular areas a'' and b'' may extend in parallel to one of dividing lines of the other circular light receiving area and hence perpendicularly to the other dividing line so that a tracking error signal may be produced from signals from the rectangular areas a'' and b'' in accordance with a push-pull method.

It is to be noted that, while the light receiving element 10 is disposed such that the light receiving face, thereof may extend perpendicularly to the optical axis L, in the alternative the light receiving element 10 as well as the incident side transmitting face $1_1$ and the emergent side transmitting face $1_5$ of the prism 1 may be inclined a little with respect to the optical axis L so as to adjust the amounts of generation of astigmatism and adjust the distortions of spots of light on the light receiving face of the light receiving element 10 so that a pair of spots similar to circles may be formed at the same time on the light receiving face.

Since a beam of light is reflected by the two faces $1_3$ and $1_4$ within the prism 1, the variation of the light path by movement of the prism 1 is comparatively small, and accordingly the reliability is high. Further, since a beam of light is reflected in a reciprocating manner within the prism 1, the distance required for a light path outside the prism 1 is reduced as much, and accordingly the overall size of the optical head can be reduced as much. Moreover, since a beam of light is split without using a polarizing splitting film or the like, P polarized light and S polarized light can be split in equal conditions, and accordingly a possible deterioration of the common-mode rejection ratio can be prevented.

It is to be noted that, while in the embodiment described above the optical axes of the blocks 1A and 1B of the prism 1 are directed in such a manner as illustrated in FIG. 2 and described hereinabove, the directions of the perpendicular optical axes may otherwise be set individually to those of the other or counterpart optical axes. Further, as a material of the prism 1, some other optical member of uniaxial crystal such as sapphire or calcite can be used.

Figure 6:
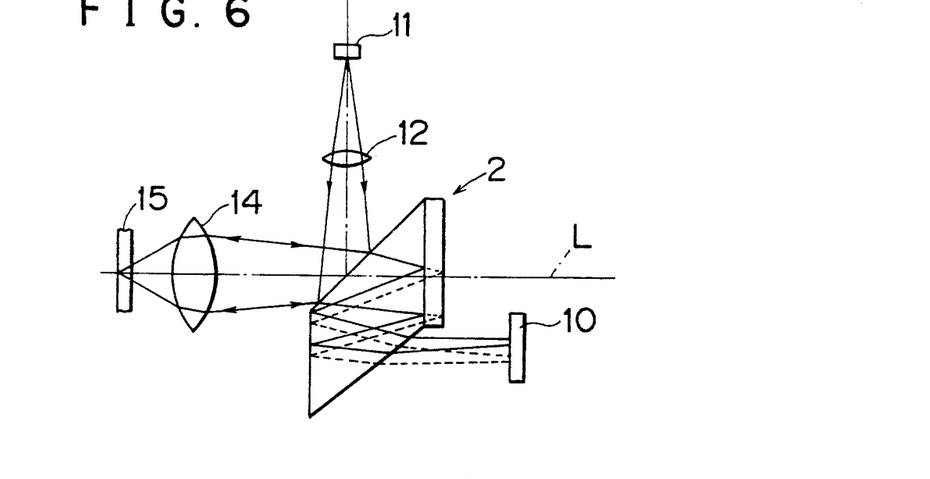
FIG. 6 is a diagrammatic representation of an optical system of another optical head showing a second preferred embodiment of the present invention.

Referring now to FIG. 6, there is shown an optical system of another optical head according to a second preferred embodiment of the present invention. The optical system shown has a similar construction to that of the optical system shown in FIG. 1 but includes a prism 2 having a different construction from that of the prism 1.

Figure 7:
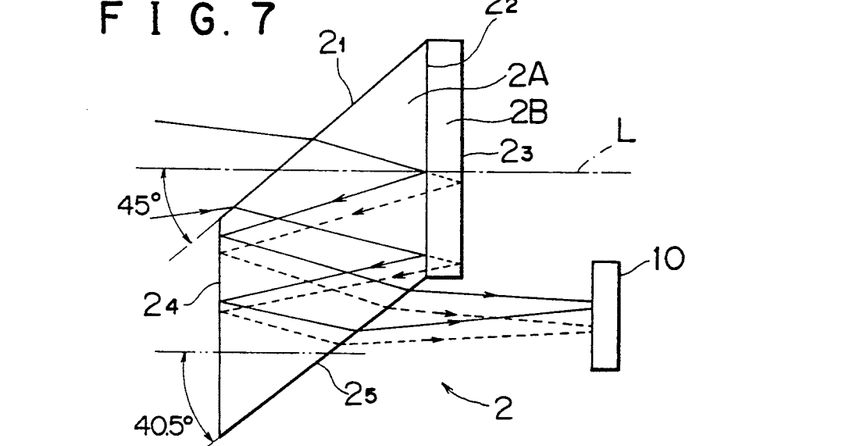
FIG. 7 is an enlarged diagrammatic representation showing a prism of the optical system of FIG. 6.

The prism 2 is shown in more detail in FIG. 7. Referring to FIG. 7, the prism 2 is composed of a first optical member 2A having a substantially parallelogram shape in side elevation and made of an optical material having a refraction index of $n_A = 1.51$, and a second optical member 2B in the form of a flat plate having a refraction index of $n_B = 0.762$ and adhered to the first optical member 2A. The prism 2 has up to five acting faces including an incident side transmitting face $2_1$ which reflects light on one hand and tansmits light on the other hand, a polarizing splitting face $2_2$ provided by an interface along which the two optical members 2A and 2B are adhered to each other, a pair of reflecting faces $2_3$ and $2_4$, and an emergent side transmitting face $2_5$ through which light passes.

The angles of the acting faces of the prism 2 are set such that the incident side transmitting face $2_1$ makes an angle of 45 degrees; the polarizing splitting face $2_2$ and reflecting faces $2_3$ and $2_4$ make an angle of 90 degrees; and the emergent side transmitting face $2_5$ makes an angle of 40.5 degrees, with respect to an optical axis L of a beam of light (converging beam of light) from an objective lens 14. Further, the prism 2 is disposed in an inclined relationship such that a plane (incidence plane) which included both of the optical axis L and a normal line to the incident side transmitting face $2_1$ may be inclined by an angle of 45 degrees with respect to the direction of a track of a photomagnetic disk 15.

The incident side transmitting face $2_1$ of the prism 2 serves as a polarizing splitting face wherein the ratio of a transmission factor $T_p$ to a reflectance $R_p$ for P polarized light, that is, $T_p/R_p$, is $\frac{1}{2}$ while the ratio of a reflectance $R_s$ to a transmission factor $T_s$ for S polarized light, that is, $R_s/T_s$, is 1/100. The incident side transmitting face $2_1$ thus reflects a laser beam from a collimator lens 12 toward the objective lens 14 while part of a beam of light reflected by the photomagnetic disk 15 and condensed by the objective lens 14 passes through but is refracted by the incident side transmitting face $2_1$ and introduced into the first optical member 2A. It is to be noted that the incident side transmitting face $2_1$ may be replaced by a half mirror. Further, part of a laser beam from the collimator lens 12 which passes through the incident side transmitting face $2_1$ may be detected in order to use the light for automatic power control of a light source 11.

After a beam of light passes through and is refracted by the incident side transmitting face $2_1$ of the prism 2, it comes to the polarizing splitting face $2_2$. Thus, an S polarized light component of the beam is reflected by the polarizing splitting face $2_2$ as indicated by a solid line while a P polarized light component passe through the polarizing splitting face $2_2$ as indicated by a broken line. Then, the reflected S polarized light is directed toward the reflecting face $2_4$ while the P polarized light passing through the polarizing splitting face $2_2$ is reflected by the reflecting face $2_3$ and passes again through the polarizing splitting face $2_2$ whereafter it is directed toward the reflecting face $2_4$.

Beams of P polarized light and S polarized light are separated in parallel to each other in this manner due to a thickness of the second optical member 2B, that is, a distance between the polarizing splitting face $2_2$ and the reflecting face $2_3$. The two beams are thus reflected in the separated condition by the reflecting face $2_4$ and then pass through and are refracted by the emergent side transmitting face $2_5$ whereafter they are introduced to a light receiving element 10.

The light receiving element 10 may have such a light receiving face as shown in FIG. 3 or 5a or 5b.

Also, in the optical system of the optical head of the present embodiment, a beam of light from the objective lens 14 is a converging beam of light and passes through the incident side transmitting face $2_1$ and the emergent side transmitting face $2_5$ both inclined relative to the optical axis L. Consequently, each of split beams of light is provided with astigmatism by the incident and emergent side transmitting faces $2_1$ and $2_5$ of the prism 2. It is to be noted that, in the present embodiment, the amounts of generation of astigmatism are adjusted and the distortion (comatic aberration) of a spot of light on the light receiving face of the light receiving element 10 is minimized by setting the incident side transmitting face $2_1$ and the emergent side transmitting face $2_5$ of the prism 2 to 45 degrees and 40.5 degrees, respectively, with respect to the optical axis L and setting the refraction indices $n_A$ and $n_B$ to such specific values as described hereinabove.

Also with the optical head of the present embodiment, similar effects to those of the optical head of the first embodiment described above can be attained.

Figure 8:
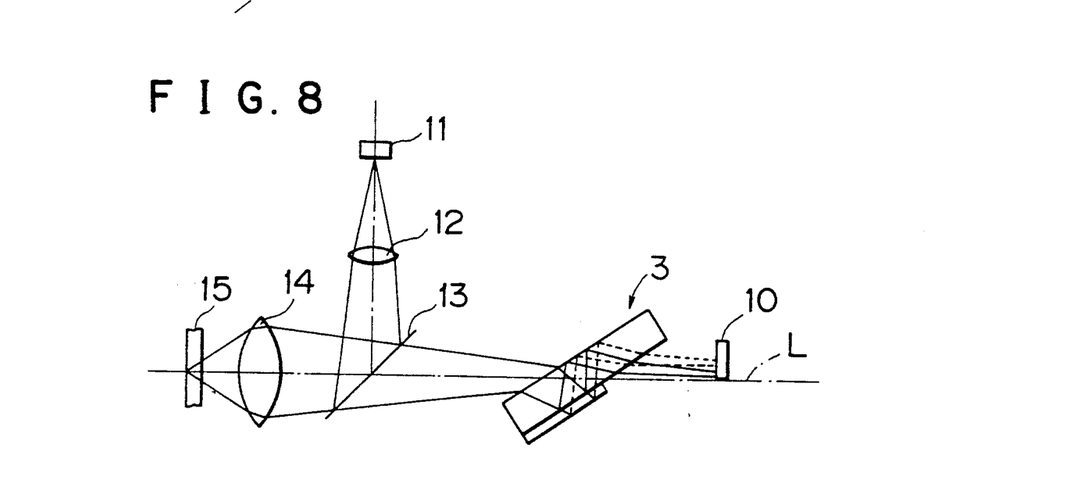
FIG. 8 is a diagrammatic representation of an optical system of a further optical head showing a third preferred embodiment of the present invention.

Referring now to FIG. 8, there is shown an optical system of a further optical head according to a third embodiment of the present invention. The optical system shown includes a semiconductor laser 11 serving as a light source, a collimator lens 12 for collimating light from the semiconductor laser 11 into substantially parallel light, a separating element 13 such as a separating prism for reflecting light from the light source 11 but transmitting reflected light from a photomagnetic disk 15 which serves as a record medium, an objective lens 14 for focusing light from the separating element 13 upon a face of the photomagnetic disk 15, a prism 3 for splitting and passing a beam of light from the separating element 13, and a light receiving element 10 for receiving light from the prism 3.

Figure 9:
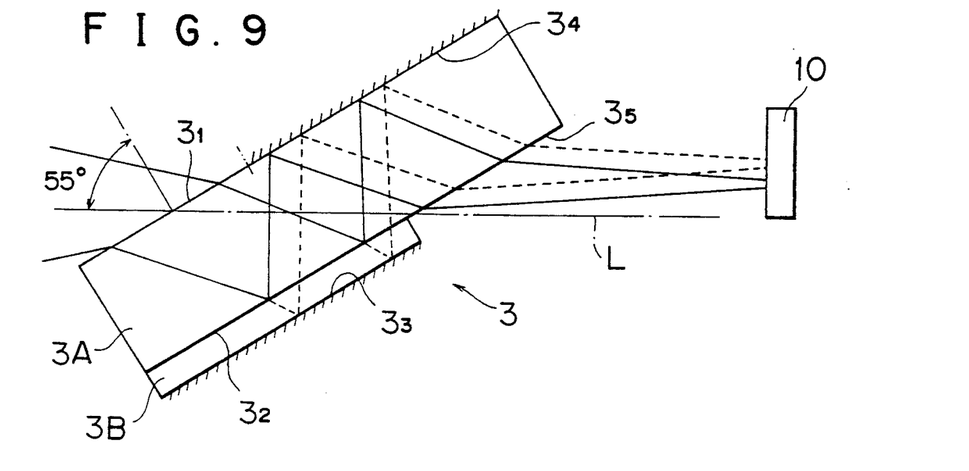
FIG. 9 is an enlarged diagrammatic representation showing a prism of the optical system of FIG. 8.

The prism 3 is shown in more detail in FIG. 9. Referring to FIG. 9, the prism 3 is composed of a first optical member 3A having a substantially rectangular shape in side elevation and made of an optical material having a refraction index of $n_A = 1.51$, and a second optical member 3B in the form of a flat plate made of an optical material having a refraction index of $n_b = 1.76$ and adhered to the first optical member 3A. The prism 3 has up to five acting faces including an incident side transmitting face $3_1$ which transmits light therethrough, a polarizing splitting face $3_2$ provided by an interface along which the two optical members 3A and 3B are adhered to each other, a pair of reflecting faces $3_3$ and $3_4$, and an emergent side transmitting face $3_5$ through which light passes.

The acting faces $3_1$ to $3_5$ extend in parallel to each other and the acting faces $3_1$ and $3_4$ extend contiguously in a same plane while the acting faces $3_2$ and $3_5$ extend contiguously in another same plate. The prism 3 is disposed in such an inclined condition that a normal line to the incident side transmitting face $3_1$ substantially makes an angle of 55 degrees with respect to an optical axis L of a beam of light (converging beam of light) from the objective lens 14 and a plane (incidence plane) which includes both of the normal line and the optical axis L may be inclined by 45 degrees with respect to the direction of a track of the photomagnetic disk 15.

A beam of light condensed by the objective lens 14 and passing through the separating prism 13 then passes through and is refracted by the incident side transmitting face $3_1$ of the prism 3, and then comes to the polarizing splitting face $3_2$. Thus, an S polarized light component of the beam is reflected by the polarizing splitting face $3_2$ as indicated by a solid line while a P polarized light component passes through the polarizing splitting face $3_2$ as indicated by a broken line. Then, the reflected S polarized light is directed toward the reflecting face $3_4$ while the P polarized light passing through the polarizing splitting face $3_2$ is reflected by the reflecting face $3_3$ and passes again through the polarizing splitting face $3_2$ whereafter it is directed toward the reflecting face $3_4$.

Beams of P and S polarized light are split in parallel to each other in this manner due to a thickness of the second optical member 3B, that is, a distance between the polarizing splitting face $3_2$ and the reflecting face $3_3$. The two beams are thus reflected in the split condition by the reflecting face $3_4$ and then introduced to the light receiving element 10 by way of the emergent side transmitting face $3_5$.

Also in the optical system of the optical head of the present embodiment, a beam of light from the objective lens 14 is a converging beam of light and passes through the incident side transmitting face $3_1$ and the emergent side transmitting face $3_5$ both inclined relative to the optical axis L. Consequently, each of split beams of light is provided with astigmatism.

It is to be noted that, in the present embodiment, the focused position on the light receiving element is adjusted by setting the refraction indices $n_A$ and $n_B$ of the first and second optical members 3A and 3B individually to such specific values as described hereinabove. Further, while the substantially parallel acting faces $3_1$ to $3_5$ of the prism 2 are inclined at an angle of about 55 degrees with respect to the optical axis L, adjustment of amounts of generation of astigmatism, adjustment of reduction in comatic aberration, adjustment of the distance between spots of light on the light receiving element 10 or adjustment of the size of the prism 3 itself can be achieved by suitably changing the setting of the acting faces $3_1$ to $3_5$ with respect to the optical axis L or by changing the setting of relative angles of the acting faces $3_1$ to $3_5$ among them.

Figure 10:
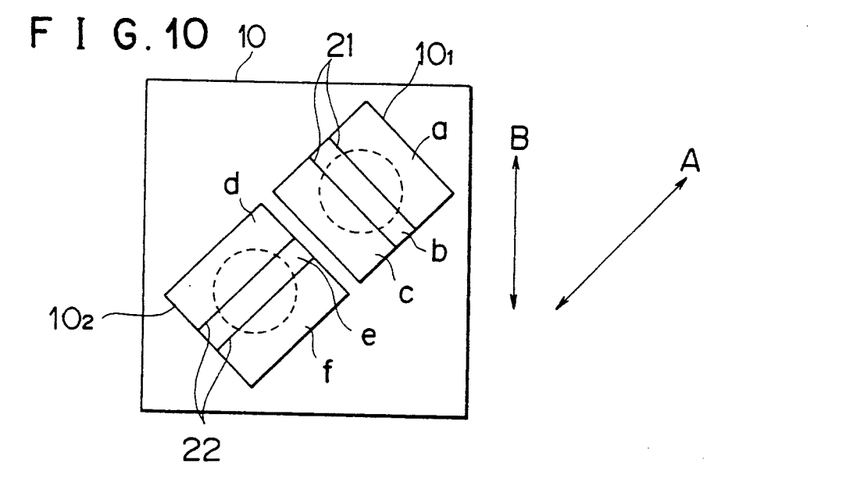
FIG. 10 is a diagrammatic illustration showing a light receiving face of a light receiving element of the optical system of FIG. 8.

FIG. 10 illustrates the light receiving face of the light receiving element 10 employed in the optical system of the optical head of the embodiment shown in FIGS. 8 and 9. Referring to FIG. 10, the light receiving face has first and second square or rectangular light receiving areas $10_1$ and $10_2$ formed thereon. Each of the light receiving areas $10_1$ and $10_2$ is divided into three parallel rectangular areas a, b and c or d, e and f by two dividing lines 21 or 22. The dividing lines 21 of the first light receiving area $10_1$ extend perpendicularly to the dividing lines 22 of the second light receiving area $10_2$, and the dividing lines 21 and 22 extend at an angle of 45 degrees in the opposite directions with respect to the direction of a track. Since the incidence plane of the incident side transmitting face $3_1$ is inclined at an angle of 45 degrees with respect to the direction of a track as described hereinabove, the direction of a track with respect to the light receiving face of the light receiving element 10 coincide with the direction indicated by an arrow mark B in FIG. 10. It is to be noted that the divided areas a to f of the first and second light receiving areas $10_1$ and $10_2$ individually output independent signals corresponding to amounts of light received.

Figure 11A:
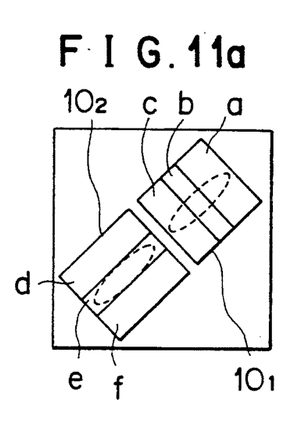
FIGS. 11a, 11b and 11c are diagrammatic illustrations showing different shapes of spots of light formed on the light receiving face of FIG. 10 depending upon focus positions.
Figure 11B:
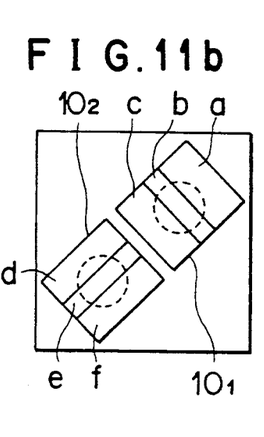
Figure 11C:
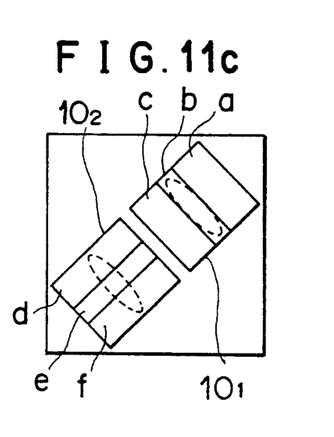

Astigmatism is provided by the prism 3 to each of two beams of light introduced to the light receiving element 10, and consequently, spots of light of such shapes as shown in FIG. 11a, 11b or 11c may be formed on the light receiving element 10. When a spot of a laser beam on the photomagnetic disk 15 presents its minimum diameter, that is, when the objective lens 14 is in a best focused position, such circular spots as seen in FIG. 11b are formed individually in the light receiving areas $10_1$ and $10_2$ of the light receiving face.

On the other hand, when the objective lens 14 is positioned nearer to the photomagnetic disk 15 than the best focused position, such spots of light as shown in FIG. 11a may be formed in the light receiving areas $10_1$ and $10_2$. In particular, in the second light receiving area $10_2$, an elliptic spot of light is formed which may be included in the central area e while another elliptic spot of light is formed in the first light receiving area $10_1$ such that it may extend across the central area b over the two outer areas a and c. On the contrary, when the objective lens 14 is positioned farther than the best focused position, elliptic spots of light are formed in the light receiving areas $10_1$ and $10_2$ as seen in FIG. 11c wherein they individually extend perpendicularly to those of the spots shown in FIG. 11a.

Now, outputs of the areas a to f corresponding to received light are represented by the reference characters of the areas and an addition and a subtraction of an output signal are represented by "+" and "−", respectively.

Figure 12A:
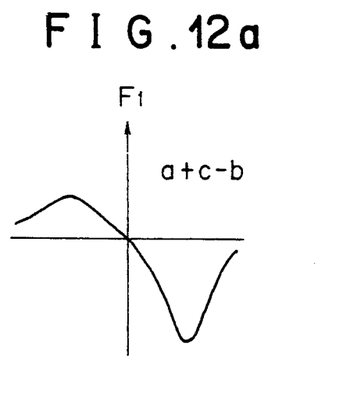
FIGS. 12a and 12b are graphs showing examples of signals obtained from different light receiving areas of the light receiving face shown in FIG. 10.
Figure 12B:
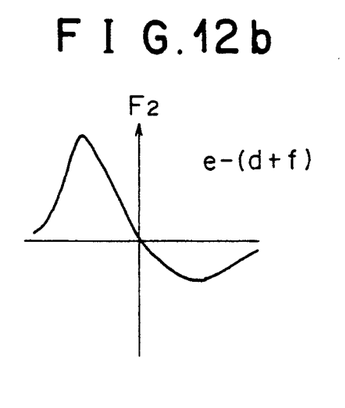

A signal produced at the first light receiving area $10_1$ in accordance with an equation $F1 = a + c - b$ presents such a variation as shown by a curve in FIG. 12a with respect to the focused position of the objective lens 14 while a signal produced at the second light receiving area $10_2$ in accordance with an equation $F2 \times e = (d + f)$ presents such a variation as shown by a curve in FIG. 12b.

While each of such signals can be used as it is as a focus error signal, since each of the signal presents an asymmetrical variation, a signal obtained by addition of the signals is taken out as a focus error signal in the present embodiment.

In particular, a focus error signal F may be produced in accordance with an equation:

$$F = [(a+c+e) - (b+d+f)]$$

Figure 13:
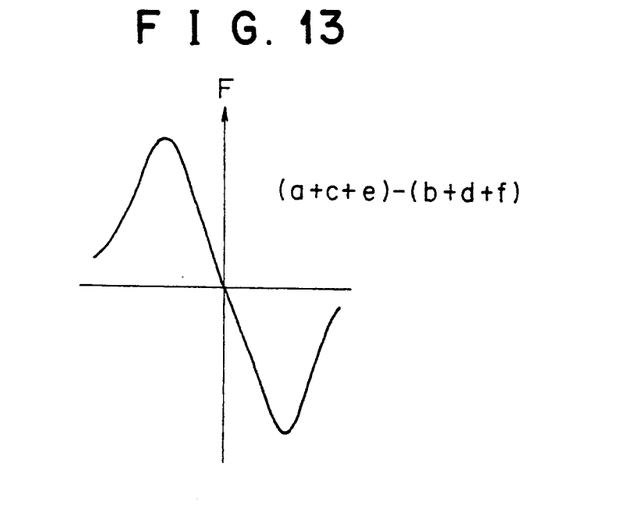
FIG. 13 is a graph illustrating a focus error signal obtained from the light receiving element of the optical system of FIG. 9.

The focus error signal F obtained in this manner presents such as symmetrical variation as seen from FIG. 13 and has a higher signal leverl than those of the signals shown in FIGS. 12a and 12b.

As apparently seen from the equation, the focus error signal F provides a difference with respect to the direction of a track. Accordingly, track crossing noises to the focus error signal are reduced. On the other hand, since the focus error signal F provides a sum with respect to the direction of 45 degrees with respect to the direction of a track, the influence of a disturbance caused by polarization of a disk can be reduced.

Meanwhile, a tracking error signal T and a photomagnetic reproduction signal R may be produced in accordance with the following equations:

$$T \times (a+f) - (d+c)$$

$$R = (a+b+c) - (d+e+f)$$

The tracking error signal T obtained in this manner is excellent in sensitivity since outputs of the central areas b and e corresponding to received light are not included in the tracking error signal.

It is to be noted that, where a reproduction signal is produced depending upon an amount of reflected light of a laser beam, the reproduction signal R' can be produced in accordance with an equation:

$$R' = a + b + c + d + e + f$$

Further, where the production signal R' does not include outputs of the central areas b and e and is thus produced in accordance with an equation:

$$R' = a + c + d + f$$

the sensitivity is further improved. Further, where the photomagnetic reproduction signal R is produced in accordance with an equation:

$$R = b - e$$

the influence of irregularities in intensity distribution around a beam of light which may be caused by double refraction of a disk can be eliminated, and hence the C/N value can be improved.

In the present embodiment, since the dividing lines 21 and 22 of the light receiving areas $10_1$ and $10_2$ of the light receiving element 10 extend perpendicularly to each other, even if the distance between two split beams of light is varied by an error of a component or an error in assembly or the like, a possible change of such distance between two beams of light can be absorbed within a degree of freedom of the light receiving area $10_2$ in the direction indicated by the arrow mark A in FIG. 10.

While each of the light receiving areas $10_1$ and $10_2$ in the present embodiment are divided into three section, the reliability can be further improved by dividing the central area b or e in parallel to the other areas a and c or d and f into two regions in order to obtain a push-pull tracking error signal from a difference between outputs of the two regions corresponding to received light.

Figure 14A:
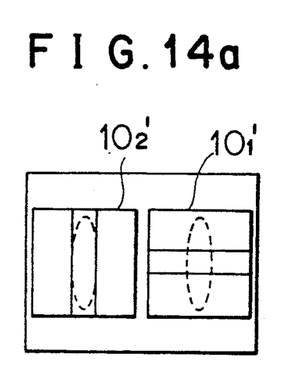
FIGS. 14a, 14b and 14c are digrammatic illustrations showing different light receiving areas for a light receiving face from those of the light receiving face shown in FIG. 10.
Figure 14B:
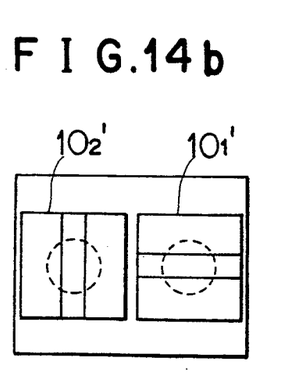
Figure 14C:
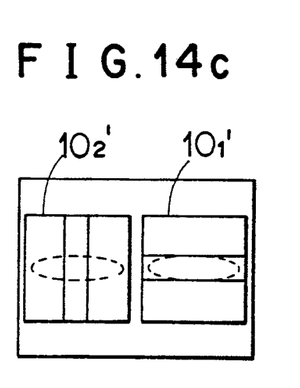

The light receiving areas of the light receiving face of the light receiving element 10 may be divided otherwise in such a manner as shown in FIGS. 14a to 14c. In particular, referring to FIGS. 14a to 14c, one of the light receiving faces $10_1'$ and $10_2'$ is divided into three sections with two dividing lines extending in parallel to the direction of a track while the other light receiving face $10_2'$ or $10_1'$ is divided into three sections with two dividing lines extending perpendicularly to the direction of a track. The light receiving element 10 is then disposed such that longitudinal directions of elliptic spots formed due to astigmatism may individually extend in parallel and perpendicularly to the direction of a track. With the light receiving element 10, a focus error signal can be produced from an output or outputs of one or both of the light receiving areas $10_1'$ and $10_2'$, and a tracking error signal can be produced from outputs of a pair of outer ones of the divided areas on the opposite sides of the dividing lines extending in parallel to the direction of a track.

Also with the optical head of the present embodiment, similar effects to those of the optical heads of the preceding embodiments described above can be attached.

Figure 15:
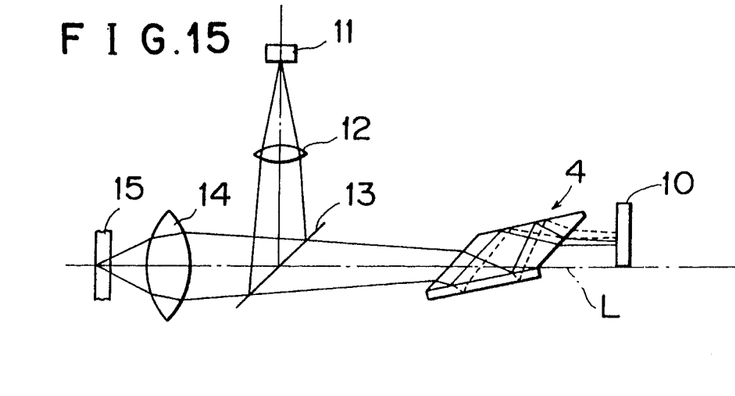
FIG. 15 is a diagrammatic representation of an optical system of a still further optical head showing a fourth preferred embodiment of the present invention.

Referring now to FIG. 15, there is shown an optical system of a still further optical head according to a fourth preferred embodiment of the present invention. The optical system shown is substantially similar in construction to that of the optical system of the third embodiment shown in FIG. 8 but is different in that it employs a prism 4 having a different construction.

Figure 16:
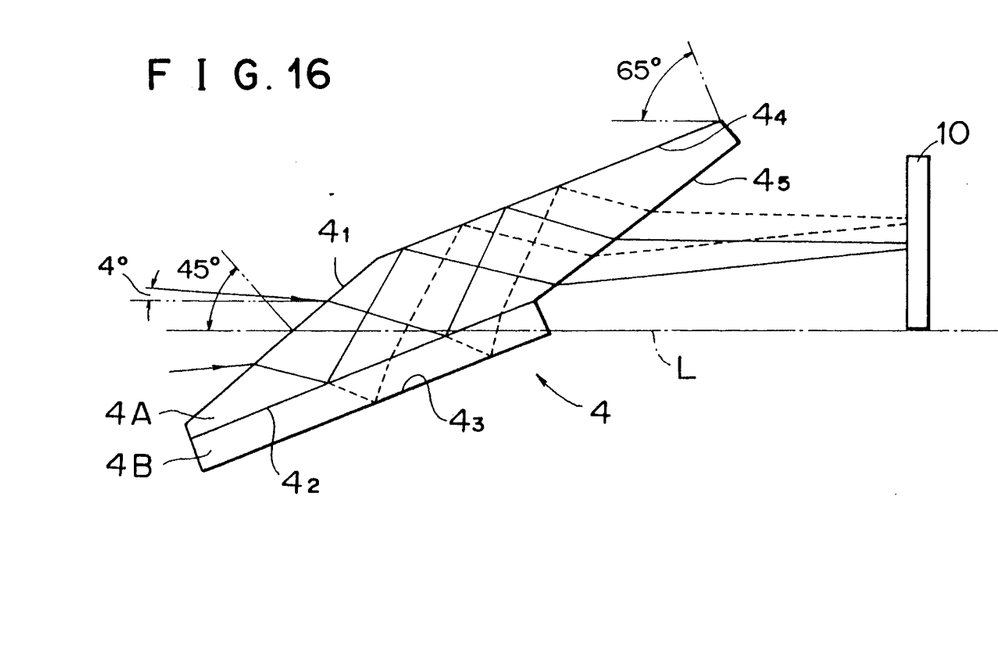
FIG. 16 is an enlarged diagrammatic representation showing a prism of the optical system of FIG. 15.

The prism 4 is shown in more detail in FIG. 16. Referring to FIG. 16, the prism 4 is composed of a first optical member 4A having a truncated parallelogram shape in side elevation and made of an optical material having a refraction index $n_B$ equal to or higher than 1.51, and a second optical member 4B in the form of a flat plate having a refraction index $n_B$ also equal to or higer that 1.51 and adhered to the first optical member 4A. The prism 4 has up to five acting faces including an incident side transmitting face $4_1$ which transmits light therethrough, a polarizing splitting face $4_2$ provided by an interface along which the two optical members 4A and 4B are adhered to each other, a pair of reflecting faces $4_3$ and $4_4$, and an emergent side transmitting face $4_5$ through which light passes.

The angles of the acting faces of the prism 4 are set such that normal lines to the incident side transmitting face $4_1$ and the emergent side transmitting face $4_5$ make an angle of 45 degrees while normal lines to the polarizing splitting face $4_2$ and reflecting faces $4_3$ and $4_4$ make an angle of about 65 degrees with respect to an optical axis L of a beam of light from an objective lens 14. Further, the prism 4 is disposed in such an inclined relationship that a plane (incidence plane) which included both of the optical axis L and the normal line to the incident side transmitting face $4_1$ may be inclined by an angle of 45 degrees with respect to the direction of a track of a photomagnetic disk 15.

A beam of light after passing through a separating element 13 then passes through and is refracted by the incident side transmitting face $4_1$ of the prism 4 and then comes to the polarizing splitting face $4_2$. Thus, an S polarized light component of the beam is reflected by the polarizing splitting face $4_2$ and directed toward the reflecting face $4_4$ as indicated by a solid line while a P polarized light component passes through the polarizing splitting face $4_2$ as indicated by a broken line. Then, the P polarized light is reflected by the reflecting face $4_3$ and passes again through the polarizing splitting face $4_2$ whereafter it is directed toward the reflecting face $4_4$. The beams of P and S polarized light split in parallel to each other in this manner due to a thickness of the second optical member 4B are then reflected by the reflecting face $4_4$ and introduced to a light receiving element 10 by way of the emergent side transmitting face $4_5$.

Also in the optical system of the optical head of the present embodiment, a converging beam of light passes through the incident side transmitting face $4_1$ and the emergent side transmitting face $4_5$ both inclined relative to the optical axis L. Consequently, each of split beams of P polarized light and S polarized light is provided with astigmatism.

It is to be noted that, in the present embodiment, the amounts of generation of astigmatism are adjusted and the comatic aberration is minimized by setting the incident side transmitting face $4_1$ and the emergent side transmitting face $4_5$ of the prism 4 to about 45 degrees with respect to the optical axis L and setting the normal lines to the polarizing splitting face $4_2$ and reflecting faces $4_3$ and $4_4$ to about 65 degrees.

The optical system of the optical head according to the present invention is suitable to a case wherein an incident beam of light from the separating element 13 makes an angle substantially within ±4 degrees with respect to the optical axis L. Thus, since the angle of the incident side transmitting face $4_1$ with respect to the optical axis L is set to 45 degrees and the refraction indices $n_A$ and $n_B$ are set to values equal to or higher than 1.51, the reflecting faces $4_3$ and $4_4$ act as totally reflecting faces. Accordingly, no coating such as a reflecting film need not be provided on such totally reflecting faces.

Further, since the normal lines to the reflecting faces $4_3$ and $4_4$ are set to about 65 degrees with respect to the optical axis L in the present embodiment, the overall height of the optical system is reduced comparing with that of the optical system of the optical head according to the third embodiment described hereinabove.

Also with the optical head of the present embodiment, similar effects to those of the optical heads of the preceding embodiments described above can be attained.

Having now fully described the invention, it will be apparent to one of ordinary skill in the art that many changes and modifications can be made thereto without departing from the spirit and scope of the invention as set forth herein.

What is claimed is:

1. An optical head, comprising a light source for emitting a laser beam, and objective lens for projecting a laser beam from said light source to a record medium and for condensing light reflected from the record medium, a prism for spliting a beam of light from said objective lens into two beams of P polarized light and S polarized light, and a light receiving element for receiving light from said prism to produce an electric signal from which a servo signal and a reproduction signal are to be produced, said prism being composed of a first optical member of uniaxial crystal and a second optical member also of uniaxial crystal, said first optical member having an incident side transmitting face and a first reflecting face which make an angle substantially equal to 45 degrees therebetween, said second optical member having an emergent side transmitting face and a second reflecting face which make an angle substantially equal to 45 degrees therebetween, said first and second optical members being adhered to each other such that optical axes thereof are directed perpendicularly to each other and said incident side transmitting face and said emergent side transmitting face extend in a parallel opposing relationship to each other while said first and second reflecting faces extend in a parallel opposing relationship to each other, said prism being disposed such that said incident side transmitting face thereof is inclined by an angle of about 45 degrees with respect to an optical axis of a beam of light from said objective lens and a beam of light from said objective lens is introduced into said prism by way of said incident side transmitting face so that the beam of light is split into two beams of P polarized light and S polarized light due to double refraction and is successively reflected by said first and second reflecting faces whereafter the two split beams of light emerge substantially in parallel to the incident beam of light to said prism from said emerging side transmitting face of said prism.

2. An optical head, comprising a light source for emitting a laser beam, an objective lens for projecting a laser beam from said light source to a record medium and for condensing light reflected from the record medium, a light beam splitting means for splitting a beam of light from said objective lens into two adjacent beams of light, and a light receiving element for receiving light from said light beam splitting means to produce an electric signal from which a servo signal is to be produced, said light receiving element having two light receiving areas each of which is divided into two or more parallel sections with a dividing line or lines, the dividing lines for said light receiving areas extending perpendicularly to each other, said light receiving element being disposed such that two light beams split by said light beam splitting means may be individually received by said two light receiving areas of said light receiving element; and wherein two split beams of light from said light beam splitting means are provided with astigmatism of the same shape in the same direction, and each of said two light receiving areas of said light receiving element includes at least three parallel sections disposed such that a spot of light having astigmatism may be received by a central one of said parallel sections of one of said two light receiving areas with the length thereof directed in parallel to the dividing lines of the one light receiving area, a focus servo signal being produced from a difference between a sum of outputs of the central section of one of said two light receiving areas and the two outer sections of the other light receiving area and another sum of outputs of all of the remaining sections of said two light receiving areas.

3. An optical head, comprising a light source for emitting a laser beam, an objective lens for projecting a laser beam from said light source to a photomagnetic record medium and for condensing light reflected from the photomagnetic record medium, a prism for splitting a beam of light from said objective lens into two beams of P polarized light and S polarized light, and a light receiving element for receiving light from said prism to produce an electric signal from which a servo signal and a photomagnetic reproduction signal are to be produced, said prism having an incident side transmitting face inclined with respect to an optical axis of a converging beam of light from said objective lens, an emergent side tansmitting face extending substantially in parallel to said incident side transmitting face, a first reflecting face for reflecting a beam of light introduced thereto by way of said incident side transmitting face, a second reflecting face extending substantially in parallel to said first reflecting face for reflecting a reflected beam of light from said first reflecting face toward said emergent side transmitting face, and a polarizing splitting face located substantially in parallel to said first and second reflecting faces between said first and second reflecting faces, wherein a converging beam of light from said objective lens is introduced into said prism by way of said incident side transmitting face and then successively reflected by said first and second reflecting faces while the converging beam of light is split into two beams of P polarized light and S polarized light by said polarizing splitting face whereafter the two split beams of light emerge substantially in parallel to the incident converging beam of light to said prism from said emerging side transmitting face of said prism toward said light receiving element.

4. An optical head as claimed in claim 3, wherein said incident side transmitting face and said emergent side transmitting face of said prism are inclined by an angle of about 45 degrees with respect to the optical axis of a converging beam of light from said objective lens while said first and second reflecting faces extend substantially perpendicularly to the optical axis.

5. An optical head as claimed in claim 3, wherein said incident and emergent side transmitting faces and first and second reflecting face of said prism extend substantially in parallel to each other.

6. An optical head as claimed in claim 3, wherein said first and second reflecting faces of said prism are inclined by a smaller angle with respect to the optical axis of a converging beam of light from said objective lens than said incident and emergent side transmitting faces.

7. An optical head as claimed in claim 3, wherein said prism provides astigmatism to two split beams of P polarized light and S polarized light with said incident and emergent side transmitting faces thereof inclined with respect to the optical axis of a converging beam of light from said objective lens.

8. An optical head is claimed in claim 3, wherein said prism is disposed such that a plane which includes a normal line to said incident side transmitting face and the optical axis of a converting beam of light from said objective lens makes an angle of about 45 degrees with respect to a track of the photomagnetic record medium.

9. An optical head, comprising a light source for emitting a laser beam, an objective lens for projecting a laser beam from said light source to a record medium and for condensing light reflected from the record medium, a prism for splitting a beam of light from said objective lens into two adjacent beams of light, said prism being composed of two optical members adhered to each other such that a polarizing splitting face is formed along the interface between said two optical members for splitting the beam of light from said objective lens into two adjacent beams of light, said prism having an incident side transmitting face and an emergent side transmitting face both of which are inclined with respect to an optical axis of the beam of light from said objective lens such that each of the split beams of light is provided with astigmatism, and a light receiving element for receiving light from said prism to produce an electric signal from which a servo signal is to be produced, said light receiving element having two light receiving areas each of which is divided into two or more parallel sections with a dividing line or lines, the dividing lines for said light receiving areas extending perpendicularly to each other, said light receiving element being disposed such that two light beams split by said prism may be individually received by said two light receiving areas of said light receiving element.

* * * * *